United States Patent
Yang et al.

(10) Patent No.: US 11,381,463 B2
(45) Date of Patent: Jul. 5, 2022

(54) SYSTEM AND METHOD FOR A GENERIC KEY PERFORMANCE INDICATOR PLATFORM

(71) Applicant: AT&T Intellectual Property I, L.P., Atlanta, GA (US)

(72) Inventors: Huijing Yang, Princeton, NJ (US); Jun Li, Cliffside Park, NJ (US); Hendra Tuty, Piscataway, NJ (US); Wenjie Zhao, Princeton, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 173 days.

(21) Appl. No.: 16/721,248

(22) Filed: Dec. 19, 2019

(65) Prior Publication Data

US 2021/0194774 A1    Jun. 24, 2021

(51) Int. Cl.
*H04L 41/142*  (2022.01)
*G06N 5/04*  (2006.01)
*G06F 16/182*  (2019.01)

(52) U.S. Cl.
CPC .......... *H04L 41/142* (2013.01); *G06F 16/182* (2019.01); *G06N 5/04* (2013.01)

(58) Field of Classification Search
CPC ......... H04L 41/14–41/147; G06N 5/04–5/048; G06F 16/18–16/1837
See application file for complete search history.

(56) References Cited

U.S. PATENT DOCUMENTS

| | | | |
|---|---|---|---|
| 2014/0129296 A1* | 5/2014 | Muraviyova | G06Q 10/06393 705/7.39 |
| 2020/0084118 A1* | 3/2020 | Gudipati | H04L 41/20 |
| 2021/0019338 A1* | 1/2021 | Grampurohit | G06F 3/0481 |

OTHER PUBLICATIONS

Plandor et al., "Generating KPI sets using genetic algorithms", 2012, IEEE 13th International Carpathian Control Conference (ICCC), pp. 564-567 (Year: 2012).*

* cited by examiner

*Primary Examiner* — Clayton R Williams
(74) *Attorney, Agent, or Firm* — Guntin & Gust, PLC; John G. Rauch

(57) ABSTRACT

A system includes a first network edge data collector, a first network edge key performance indicator (KPI) engine configured to operate on first data collected by the first network edge data collector, a KPI metrics manager in communication with the first network edge KPI engine, the KPI metrics manager controlling a KPI metric catalog and wherein the first network edge KPI engine determines first edge KPI metric using a metric algorithm from the KPI metric catalog on the first data.

20 Claims, 12 Drawing Sheets

SYSTEM AND METHOD FOR A GENERIC KEY PERFORMANCE INDICATOR PLATFORM

TECHNICAL FIELD

This disclosure is directed to a centralized system to standardize the management of a key performance indicator metrics catalog and events metadata.

BACKGROUND

As the number of network-connected devices grows, now and in the evolution to 5G and beyond, the volume of data traffic will increase significantly, including mobility data traffic as well as data traffic generated by Internet of Things (IoT). 5G real time use cases wherein large amount of data are consumed to support self-driving cars, augmented reality, virtual reality, eHealth applications, industrial robotics and other applications will impose a significant challenge to the traditional data processing platform. Moving or sharing large amounts of data from edge devices to central locations would introduce an extra traffic load to operator's already crowded network, and unacceptable delays to many time-sensitive microservices/applications.

The tremendous data traffic growth will bring about new data useful for network planning to get a better understanding of users' behavior and network characteristics. Key Performance Indicators (KPIs) are the most important metrics that indicate the network health and user's quality-of-experience (QoE). Complex KPIs, some of which are similar to each other and others that are vastly different, are used by almost all analytics microservices or applications, regardless of whether they are located at the edge or centrally located. The creation and implementation of custom KPI algorithms sufficient to monitor the health of complex networks is time consuming, inefficient and not readily repeatable. The vast majority of KPIs will likely be designed and developed for many and various systems with long development cycles and consuming expensive resources without the ability to share or reuse the algorithms. Moreover, there is no centralized user interface for KPI development, cataloging, or source metadata management. Rather, KPI and source metadata definitions are passed by notes and files, and are specific to each microservice or application.

Thus, there is a need for a centralized KPI management system wherein a KPI catalog of algorithms can be created, modified, versioned, viewed, searched and compared with other KPIs. More, there is a need for a centralized KPI calculation engine management system where KPI calculation processes can be configured, monitored, provisioned, instantiated and scaled to monitor such complex networks.

SUMMARY

The present disclosure is directed to a system including a first network edge data collector, a first network edge key performance indicator (KPI) engine configured to operate on first data collected by the first network edge data collector, a KPI metrics manager in communication with the first network edge KPI engine, the KPI metrics manager controlling a KPI metric catalog and wherein the first network edge KPI engine determines first edge KPI metric using a metric algorithm from the KPI metric catalog on the first data. The system may further include a second network edge data collector and a second network edge KPI engine, wherein the second network edge KPI engine is in communication with the KPI metrics manager and is configured to operate on second data collected by the second network edge data collector to determine a second edge KPI metric using a metric algorithm from the KPI metric catalog. The system may further include a regional KPI engine in communication with the first network edge KPI engine, the second network edge KPI engine and the KPI metrics manager, wherein the regional KPI engine is configured to run a KPI metric algorithm from the KPI metric catalog using the first edge KPI metric and the second edge KPI metric. In an aspect, the KPI metrics manager may provide a representational state transfer application programming interface (REST API) to the first edge KPI metrics engine to access the KPI metric catalog. The system may also include a user interface in communication with the KPI metrics manager, wherein the user interface is configured to modify a KPI metric algorithm from the KPI catalog based on receipt of a representational state transfer application programming interface (REST API) from the KPI metrics manager and store the modified KPI metric algorithm in the KPI catalog. In an aspect, the first data is streamed to the first network edge KPI engine or in another aspect, the first data is input in a batch mode to the first network edge KPI engine. In an aspect, the first network edge KPI engine accesses the first data using a Hadoop distributed file system. The first network edge KPI engine includes a machine learning algorithm.

The disclosure is also directed to a method including receiving a first request for a first KPI metric, submitting a query to a KPI catalog, selecting the first KPI metric algorithm, forwarding the first KPI metric algorithm to a first KPI engine for a calculation of a first KPI. The KPI may be customized based on the request. The first request may be based on a first data set collected by a network. In an aspect, the query is dynamically generated based on the first data set. The method may further include refreshing the state of a KPI manager based on the first data set.

The method may further include receiving a request for a second KPI metric, submitting a second query to the KPI catalog, selecting the second KPI metric algorithm, and forwarding the second KPI metric algorithm to a second KPI engine for a calculation of a second KPI metric and wherein the first KPI engine operates on a first edge network data set and the second KPI engine operates on a second edge network data set. The method may further include receiving a request for a third KPI metric, submitting a third query to the KPI catalog, selecting the third KPI metric algorithm, and forwarding the third KPI metric algorithm to a third KPI engine for a calculation of a third KPI metric and wherein the third KPI engine operates on the first KPI metric and the second KPI metric.

The disclosure is also directed to a method including calculating KPIs on event metadata at a network edge, aggregating the KPIs from the calculating step, and determining regional KPIs based on the aggregating step. The method may further include accessing a KPI metric algorithm from a KPI metrics catalog and wherein the calculation step is performed using the KPI metric algorithm. The method may further include accessing a second KPI metric algorithm from the KPI metrics catalog and wherein the determining step is performed using the second KPI metric algorithm.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
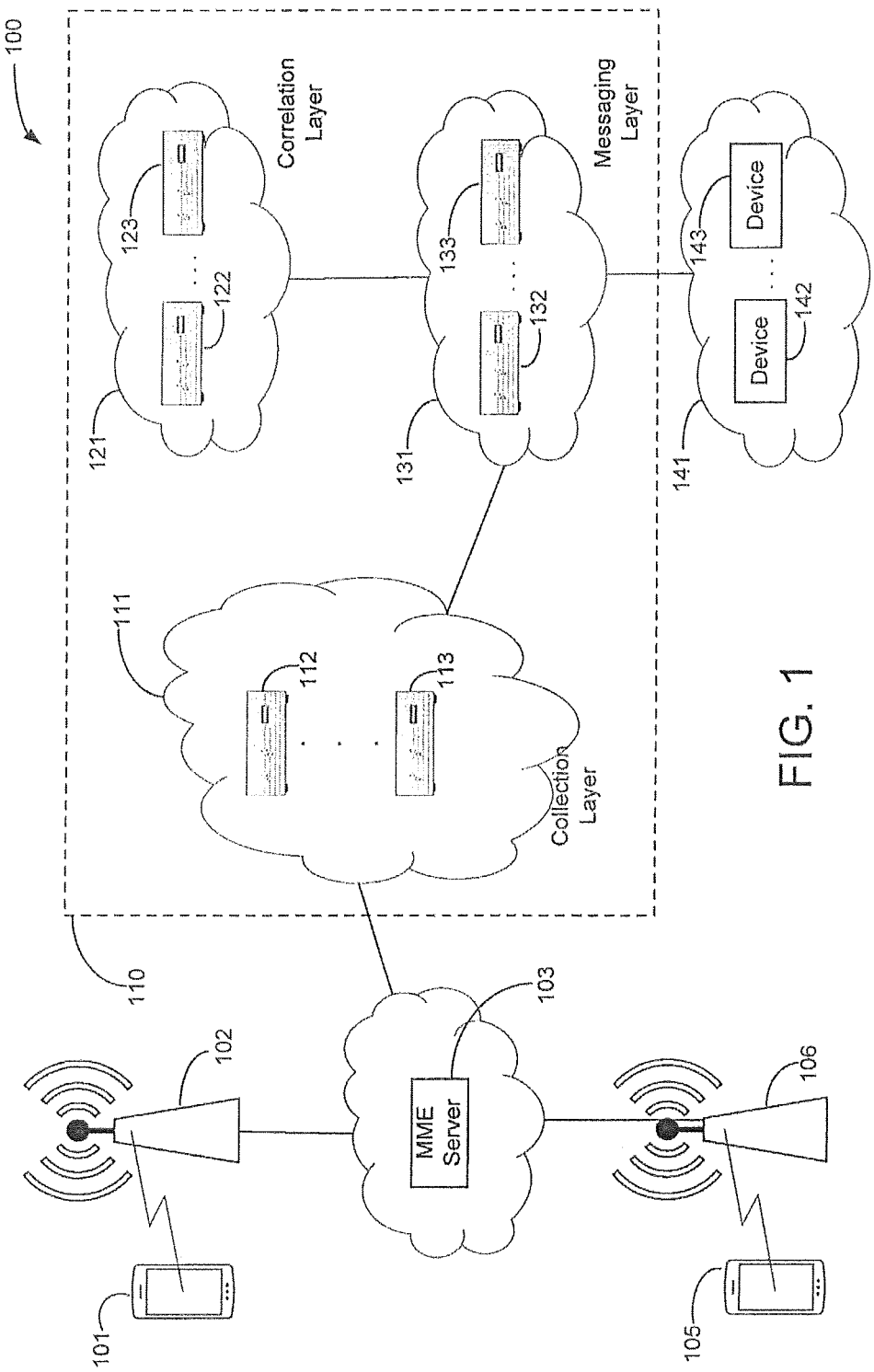
FIG. 1 illustrates an exemplary system for implementing collecting bulk data.

System Overview.

This disclosure is directed to a novel system and method for a centralized KPI management system where KPI catalogs may be created, modified, versioned, viewed, searched and compared with other KPIs. KPIs may be rapidly created from definition to realization. The disclosure may use a representational state transfer (REST) software architecture in which REST application programing interfaces (APIs) are utilized. The disclosure provides a system and method which creates a practical application for the efficient scaling, development and deployment of KPIs and as such, advances the state of the technological arts in telecommunications.

In an aspect, there may be a centralized metadata management system for source data, such as raw counters, event fields, and the like. There may also be a centralized KPI calculation engine management system where KPI calculation processes may be configured, monitored, started, stopped and scaled-up or scaled-down. The generic implementation of a KPI calculation engine permits the source code of one KPI engine be configured to calculate different KPIs and run different nodes. The disclosure also minimizes data transportation and optimizes data sharing between different network nodes.

The present disclosure includes a distributed scalable near-real time realization of KPI metrics that is capable of handling either streaming, batch file or database inputs and generate corresponding streaming, batch file or database outputs on the platform. The disclosure includes a centralized web-based management system for defining and cataloging KPI metrics categories, source metadata libraries, and KPI calculation engine processes. A common user interface provides access to a KPI library and event data. The user interface also supports the use of standardized or customized, i.e., user defined functionality, KPIs as well as complex—KPIs on KPIs—metrics calculations.

In an aspect, there may be a KPI engine that may, for example, use Apache Spark or other analytics engines to provide a fast, scalable, fault-tolerant cluster computing system. Temporary local or global views may be created based on data frames using streaming data or batch data files. Spark SQL or other structured data queries based on these views may, for example, be executed on the Spark engine. Such SQL queries are configurable and may be dynamically generated, for example, by reading from Redis memory store, and may, for example, include details such as selections, aggregations, event-time windows, stream-to-batch joins and conditions. Event configuration and processing status information may, for example, be stored in Java Script Object Notation (JSON) format in Redis.

The KPI engine(s) may interact with a KPI metrics manager. Such a KPI metrics manager may, for example, uses a Java service such as a Java service container (JSC) to provide representational state transfer (REST) application programming interfaces (APIs) for the user interface and KPI engine(s) to create a centralized KPI metrics catalog and facilitate KPI engine(s) management functionality. Event configurations and processing status information within KPI engine(s) may be refreshed by a KPI agent via push or pull mechanism to a KPI manager's REST APIs. Using metadata driven auto-complete features and syntax driven formula verification & evaluation, users are able to more easily and accurately define KPI metrics formulas.

Operating Environment.

The system and method provided herein allows real time or near real time collection and processing of massive device data from an operating network, mainly per user device data and IoT data. The system and method of the present disclosure is agnostic to the method of collection and the apparatus used therefore. As an example only of an operating environment, a process used in a Streaming Events and Mediation (STEM) process developed by the assignee of this disclosure will be described in conjunction with FIG. 1 and FIGS. 9-6.

Collection of Data.

FIG. 1 illustrates an exemplary system 100 for implementing bulk data processing. As shown, there may be mobile device 101 or mobile device 105 (e.g., laptop, tablet, internet of things devices), which may be connected with eNodeB 102 or eNodeB 106. Mobility Management Entity (MME) 103 may be connected with a STreaming Events and Mediation (STEM) layer 110, which may include a network of servers with different sub-layers (e.g., collections of servers—network 111, network 121, network 131) that collect and process data in a particular manner. Network 111 may include devices, such as server 112 or server 113, which process data for a collection layer. Network 121 may include devices, such as server 122 or server 123, which process data for a correlation layer. Network 131 may include devices, such as server 132 or server 133, which process data for a messaging layer. Network 141 may include devices, such as device 142 or server 143, which process data for an application layer. The elements of system 100 may be communicatively connected with each other.

Collector network 111 may be used for obtaining (e.g., collecting) device data from network elements which originate from connected devices 101, 105. There may be multiple types of collectors in collector network 111 with each type designed to handle data ingestion for a specific vendor data format and transmission mechanism. Depending on the mechanism involved, the collector network 111 may obtain the data and performs initial decoding of the data.

Using the above-described STEM process or any other process for collecting device data from connected network devices, there may be large amounts of unstructured data sets to be used in the system and methods described herein.

Exemplary Platform Architecture.

The present disclosure is applicable across multiple industries and with various configurations. For the purposes of this disclosure, an exemplary but non-limiting software defined network telecommunications system utilizing virtual network functions will be used.

Figure 2:
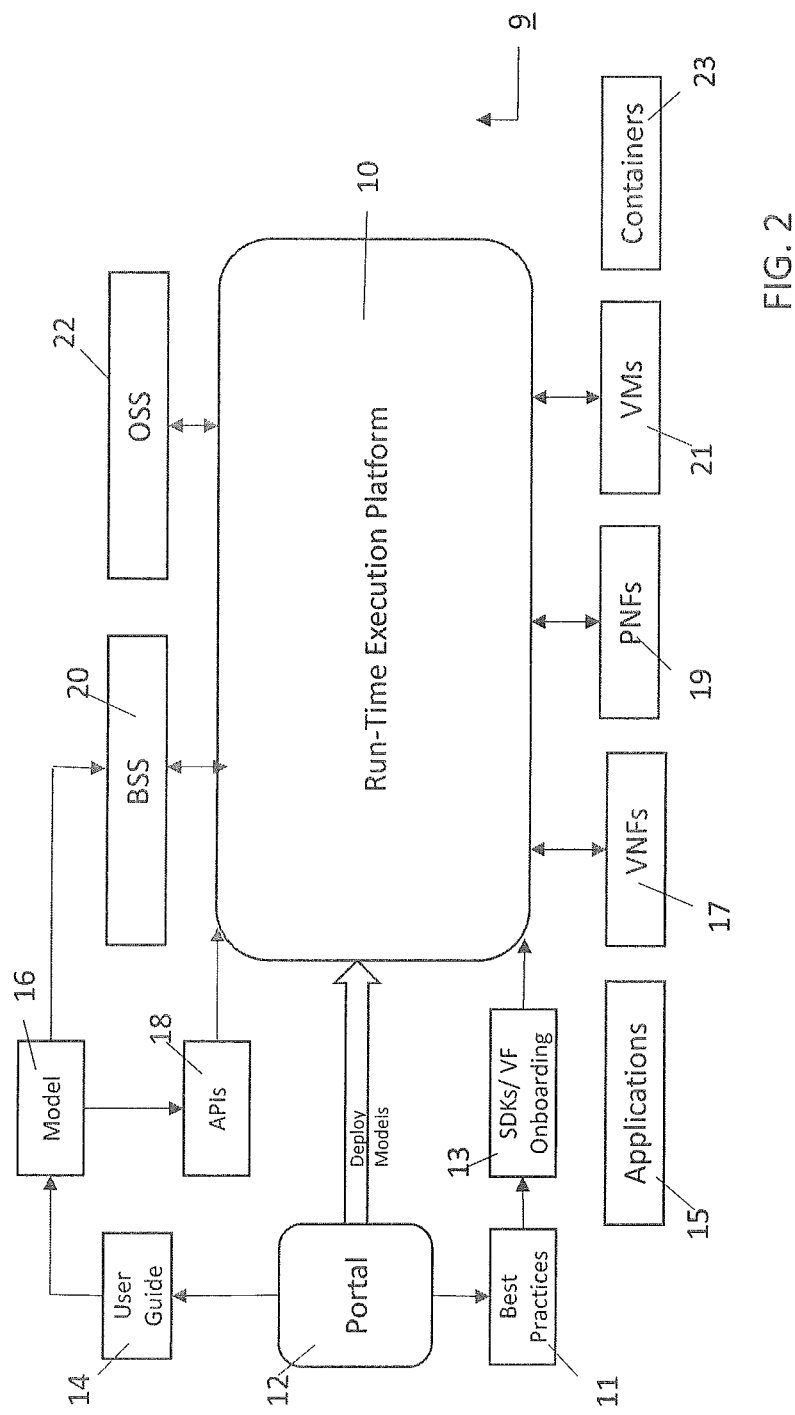
FIG. 2 illustrates an exemplary diagram of a run-time execution platform upon which the system and method of the present disclosure may operate.

Generally, a run-time execution platform 10 shown in FIG. 2, which may, for example, be configured as an ECOMP/ONAP platform and which may be considered the intelligence in a software defined network (SDN) that provides lifecycle management and control of software-centric network resources, infrastructure and services. It will be understood that ECOMP/ONAP is but one example of a run-time execution platform 10 which may serve as the operating environment for the present disclosure and that ECOMP is an execution platform owned by an affiliate of the assignee of the present disclosure. The run time execution platform 10 may be a reusable platform of software assets comprising the following functionality:

Service Design and Creation (SDC)—Provides a well-structured organization of visual design & simulation tools, templates and catalogs to model and create resources, services and products;

Service Orchestration (SO)—Arranges, sequences and implements tasks based on policies and rules/recipes to coordinate the creation, modification or removal of logical and physical resources in the managed environment;

Data Collection, Analytics and Events (DCAE)—Provides real-time fault, performance, event and other data collection, correlation & analysis to manage service, network and infrastructure health and support closed loop automation;

Policy—Modifiable rules, assertions and/or conditions to enable real-time decision making on corrective actions and configuration changes in the software-centric network ecosystem;

Active and Available Inventory (A&AI)—tracks the dynamic relationships of virtualized networks, services & resources, their relationships and status to maintain ECOMP/ONAP platform integrity and the global inventory it manages;

DN & Application Controller—SDN Controllers configure, monitor and maintain the health of network services and elements throughout their lifecycle. Application controllers configure, monitor and maintains the health of an applications throughout their lifecycle; and Portal—Provides a common portal framework and UI architecture for creating and operating virtual infrastructure and services. Examples of capabilities include common look and feel, role administration, access control, SDK with plug-ins and web components.

While the present disclosure describes the generic key performance indicator platforms operating on an ECOMP type of platform, the system and method described herein, and the claims appended hereto apply to the use of key performance indicators may apply to any network configuration.

With reference to FIG. 2, there is shown a system 9 in which the present disclosure may operate. The system 9 may be configured to support the provision, operation and maintenance of a wireless communication network which may, for example, be 3G, 4G/LTE, 5G, or any other wireless communication system now known or to be developed. The wireless communication network may be configured in part or in whole using software defined network components. The system 9 may include a run-time execution platform 10 which may, for example, be an ECOMP/ONAP platform. The run-time execution platform 10 may also be referred to simply as platform 10 herein. The platform 10 may be a single entity that provides management functions in a uniform manner to onboard, deliver and manage the lifecycle of SDN resources and services. The applications that use the platform 10 may interact with it via application program interfaces (APIs) 18 so applications need not have to know all of the inner components that comprise platform 10 and system 9.

The platform 10 may be accessible by a portal 12 which may, for example, be a server or other device that is operable to access and control the platform 10 and through which user or service provider generated models may be deployed on platform 10. A user guide 14 may assist a user in creating models 16 for an application. The models 16, together with APIs 18, may then determine the resources desired for the business support systems (BSS) 2 which in turn, may access the platform 10 for placing orders, monitor usage and perform other accounting functions. The models 16 and APIs 18 may also be used to determine and request features, functionality and capacity of the operational support systems (OSS) 22, which may, for example, include capacity, fallout, and key performance indicators (KPIs) and the like.

The portal 12 may also provide access to best practices 11 for SDN networks with respect to on-boarding and configuring new applications 15. Through the portal 12, users may access software development kits (SDKs) and virtual function on-boarding functions 13 to support models 16. From there, the platform 10 may control the instantiation of virtual network functions (VNFs) 17, physical network functions (PNFs) 18 and virtual machines (VMs) 21.

Figure 3:
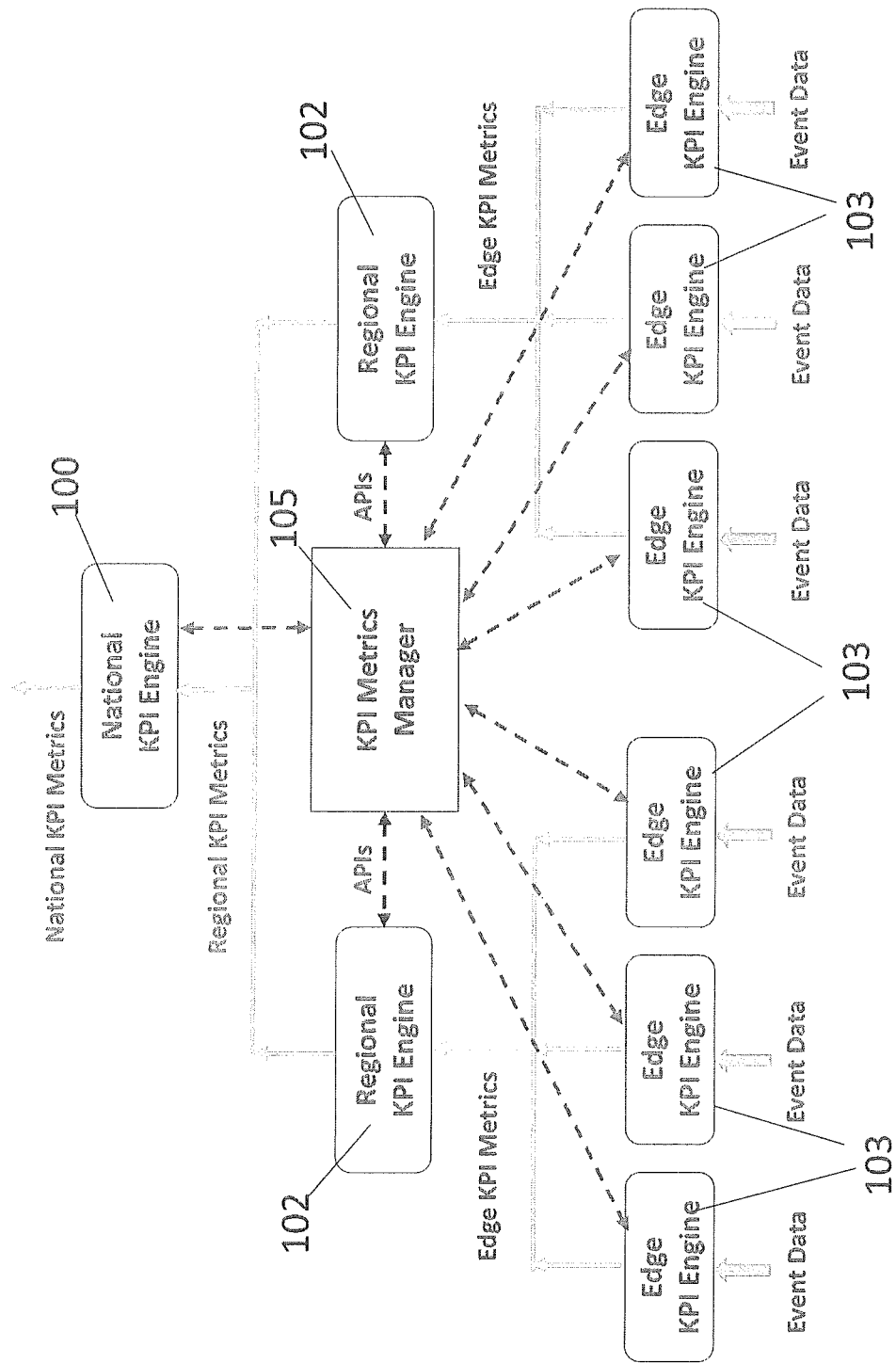
FIG. 3 illustrates a diagram of an exemplary hierarchal configuration of KPI engines.

With reference to FIG. 3, there is shown exemplary system architecture having multiple KPI engines configured in a hierarchal arrangement. This hierarchal arrangement may be deployed on a national scale or a regional scale. There may be one or more edge KPI engines 103 working in conjunction with edge processing devices. The one or more edge KPI engines 103 which may operate on event data generated by such network edge processing devices and captured in the network 111, 121, 131 as described above. As described in further detail below, each of the multiple KPI engines may include an analytics engine such as Apache Spark or other analytics engine to provide a fast, scalable, fault-tolerant cluster computing system to act upon the event data. Each of the edge KPI engines 103 may output edge KPI measurements for that particular edge location.

Edge KPI engines 103 may feed edge KPI metrics into regional KPI engines 102. Regional KPI engines 102 may feed regional KPI metrics into the national KPI engine 100. There may be a national KPI engine 100 used to generate KPIs for a national network. It will be understood that the three hierarchal levels are exemplary only and there may be one KPI engine level or more than three KPI engine levels. For example, the national KPI engine 100 may interact with four regional KPI engines 102, each of which interacts with another 4 sub-regional KPI engines (not shown) and each of which interacts with multiple edge KPI engines 103. There is shown a KPI metrics manager 105 which may, for example, be configure using a microservice Java service container. The KPI metrics manager 105 may provide the metrics algorithm for each KPI engine's calculations, either by accessing the appropriate algorithm from the database and using it as is or by modification of the existing algorithm. The KPI metrics manager 105 may provide a different KPI metrics algorithm for each of the hierarchal levels. The KPI metrics manager 105 may also provide the KPI metrics an algorithm based on the type of metrics requested, the location of the data and the portion of the network being measured, performance characteristics of the network and the history of the metrics for a particular subnetwork or network component.

Figure 4:
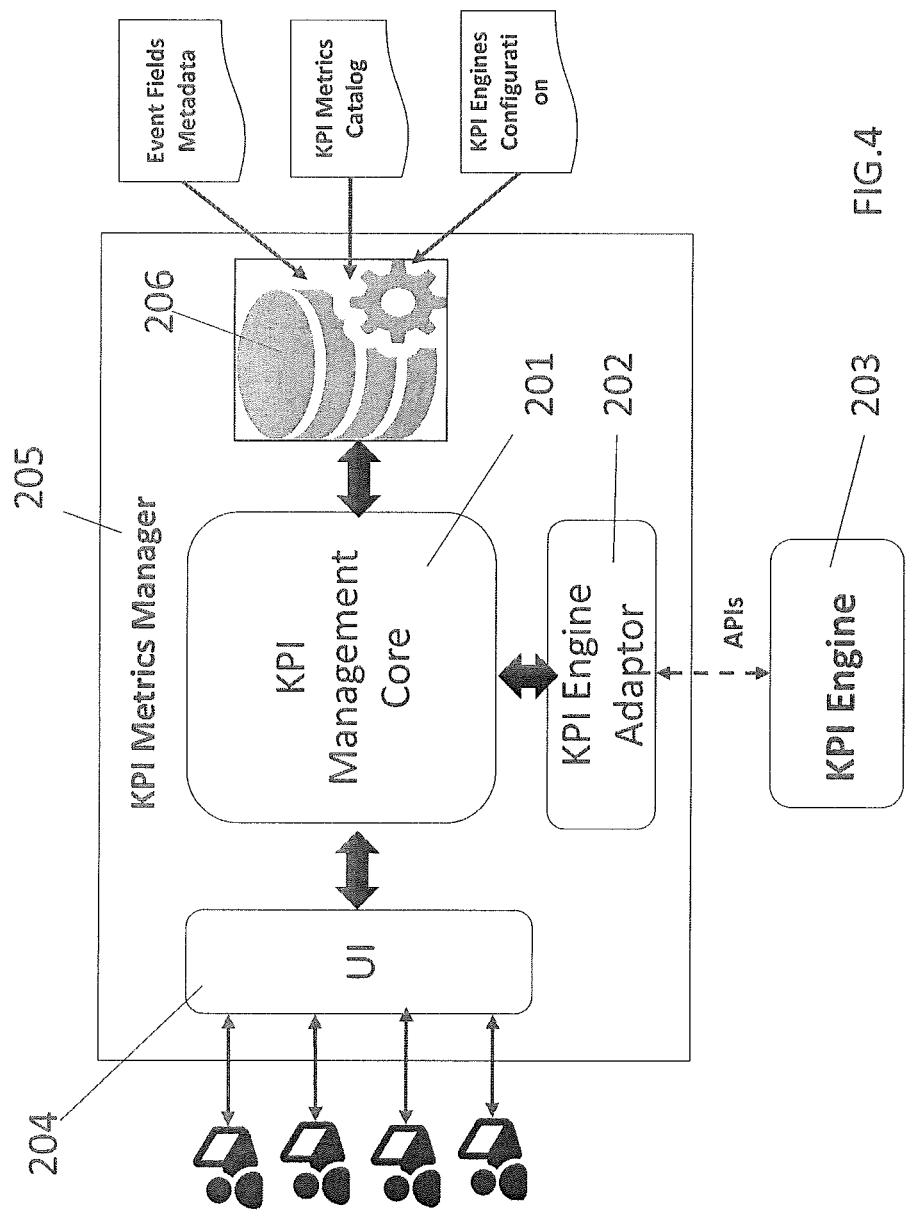
FIG. 4 illustrates an exemplary diagram of a generic KPI metrics manager in accordance with the present disclosure.

With reference to FIG. 4, there is shown a KPI metrics manager 205 with exemplary components identified. There is shown a KPI management core 201 which provides the basic functionality of and the interfaces for the KPI metrics manager 205. There is shown a user interface (UI) 204 in communication with the KPI management core 201. The UI 204 may be implemented, for example, using Angular JavaScript or some other open source or, alternatively, a proprietary programming language The UI 204 provides an interface for operators to both create or modify KPIs and to monitor the network through the calculation of relevant KPIs. The KPI management core 201 also interfaces with database 206, which may, for example, include event fields metadata, a catalog of KPI metrics which can be called for execution and modification by the KPI management core 201, a configuration tables for KPI engines 203. The database 206 may be configured using a Redis database accessible by SQL queries. There may be exposed event processing configuration information via a REST API. There is also shown a KPI engine adaptor 202 which provides REST APIs for communication to and from KPI engines 203.

Figure 5:
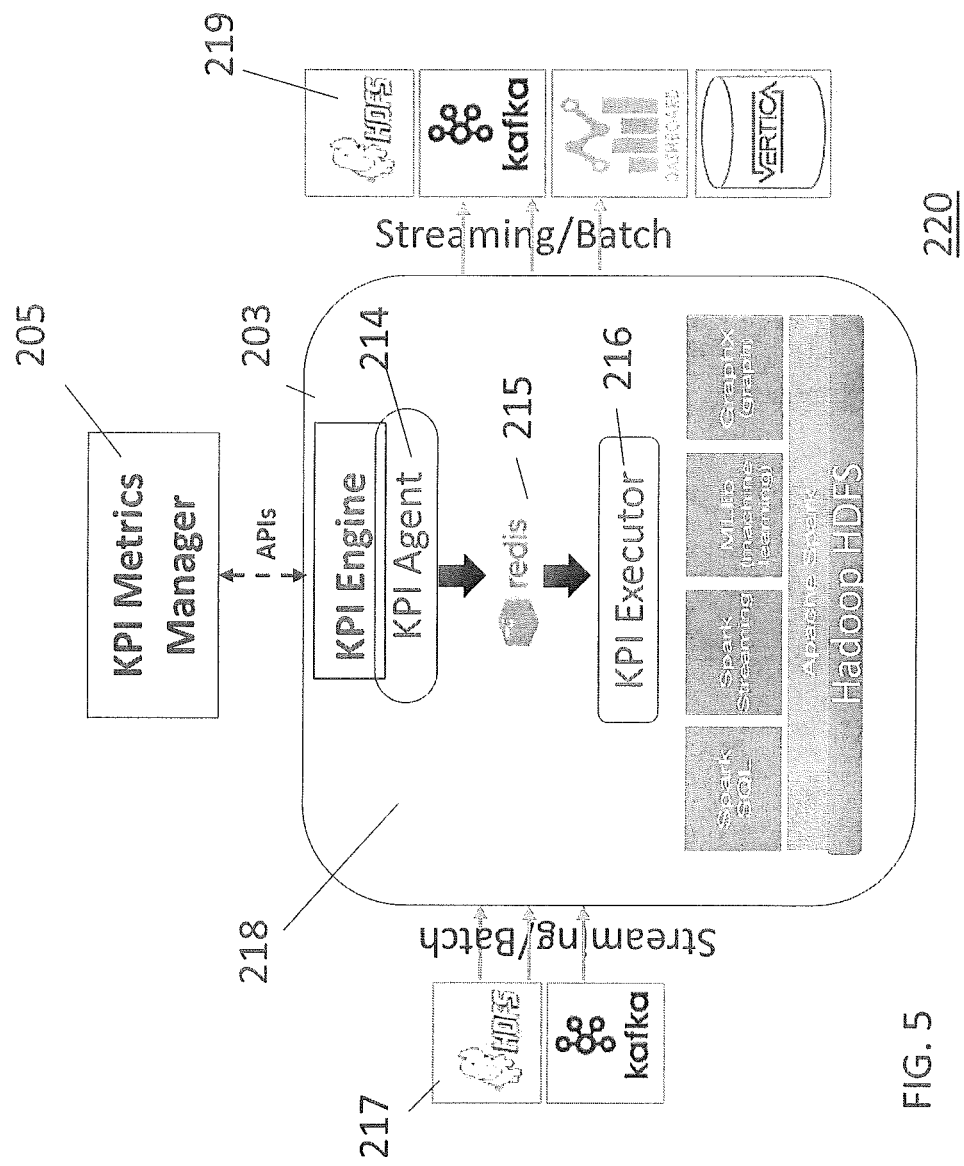
FIG. 5 illustrates an exemplary diagram of a KPI metrics engine in accordance with the present disclosure.

The description continues with reference to FIG. 5. The KPI metrics manager 205 is in communication with KPI engine 203. There is shown within KPI engine 203 a KPI agent 214 in communication with KPI executor 216 through Redis database 215. The KPI agent 214 may include demon processes which may periodically update Redis store by reading from REST APIs.

The KPI engine 203 may be implemented using Apache Spark as a fast, scalable, and fault-tolerant cluster computing system that periodically updates event processing information from Redis. Apache Hadoop distributed file system (HDFS) may also be used to provide a collection of open-source software utilities that facilitate using a network of computers to implement machine learning and the processing of large amounts of data. In an aspect, the KPI engine may use machine learning algorithms to improve the performance, efficiency or accuracy of the KPI calculations.

Streaming and batch data inputs (217) to the KPI engine 203 may include Kafka and HDFS. Apache Kafka is a distributed publish-subscribe messaging system that receives data from disparate source systems and makes the data available to target systems in real time. Outputs (219) of the KPI engine 219 may include streaming or batch data to Kafka and HDFS systems, a dashboard which may include live-updated KPI charts or graphs, and an analytics platform such as Vertica.

Methods of Use.

Figure 6:
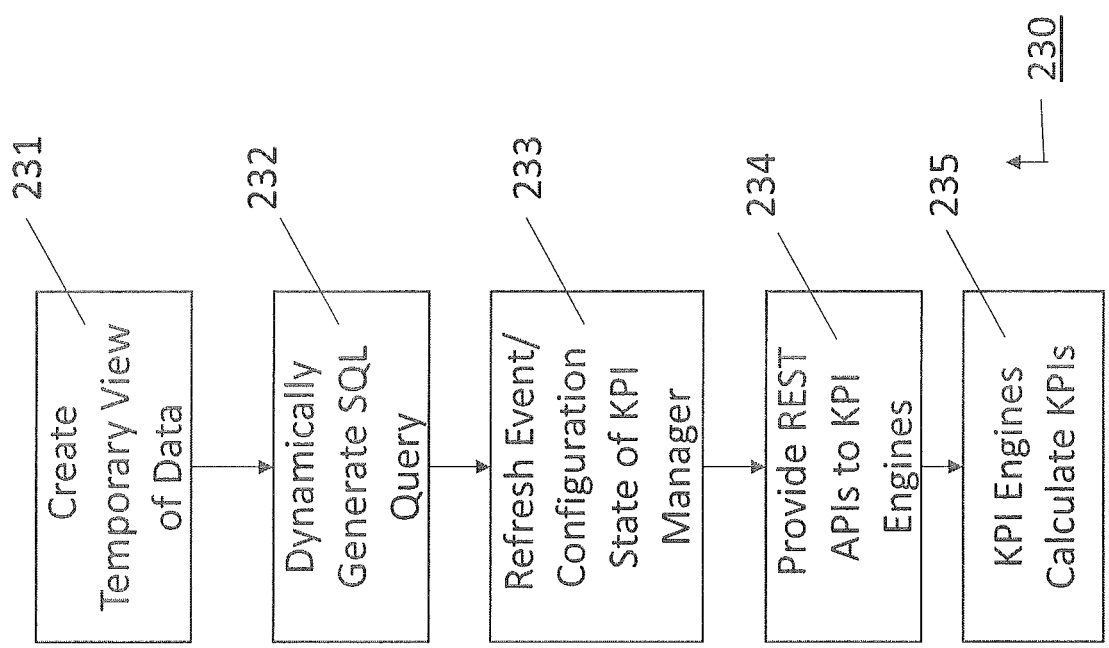
FIG. 6 illustrates an exemplary method for dynamically calculating a KPI metric to be used on a data set.

With reference to FIG. 6, there is shown an exemplary method 230 illustrating the configuration and execution of generic or customized KPIs for a network. At 231, a temporary view of event data, either locally or globally, is created. This view may be created based on data frames from streaming data or batch files. The data may be collected from edge processing systems and components as described above. At 232, an SQL query is dynamically generated. SQL queries based on these temporary views may be executed on a Spark SQL engine. The SQL queries may include details such as selections, aggregations, event-time windows, stream-to-batch joins and other conditions. The queries may be configurable and may be dynamically generated by reading from a Redis database. At 233, the event/configuration state is refreshed. In an example, all event configuration and processing status information which is stored in Redis, which may, for example, be in in JSON format, may be refreshed by a KPI Agent via push/pull mechanism to KPI manager's REST APIs. At 234, the KPI metrics manager may provide REST APIs to one or more KPI engines. KPI Metrics Manager may use a Java service container to provide the REST APIs for KPI Engines to implement a centralized KPI metrics catalog and KPI Engine management. At 235, the KPI engines calculate the KPIs using KPI metrics from the KPI metrics catalog.

Figure 7:
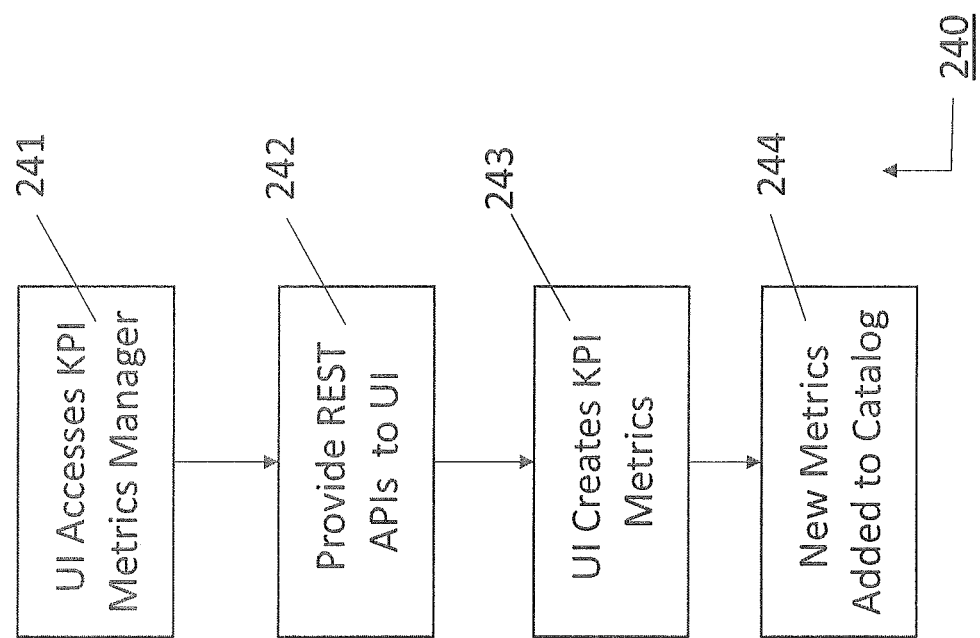
FIG. 7 illustrates an exemplary method for creating new KPI metrics in accordance with the present disclosure.

With reference to FIG. 7, there is shown an exemplary method 240 is which a user may access a centralized metrics catalog to define, modify or use a KPI metrics algorithm. At 241, the UI access the KPI metrics manager. At 242, the KPI metrics manager provides REST APIs to the UI. At 243, the UI may access the KPI metrics catalog and define or modify a KPI metric. At 244, a new KPI metric is added to the KPI metrics catalog. Thru metadata driven auto-complete feature and syntax driven formula verification & evaluation, users are able to define KPI Metrix formula easily and correctly.

Figure 8:
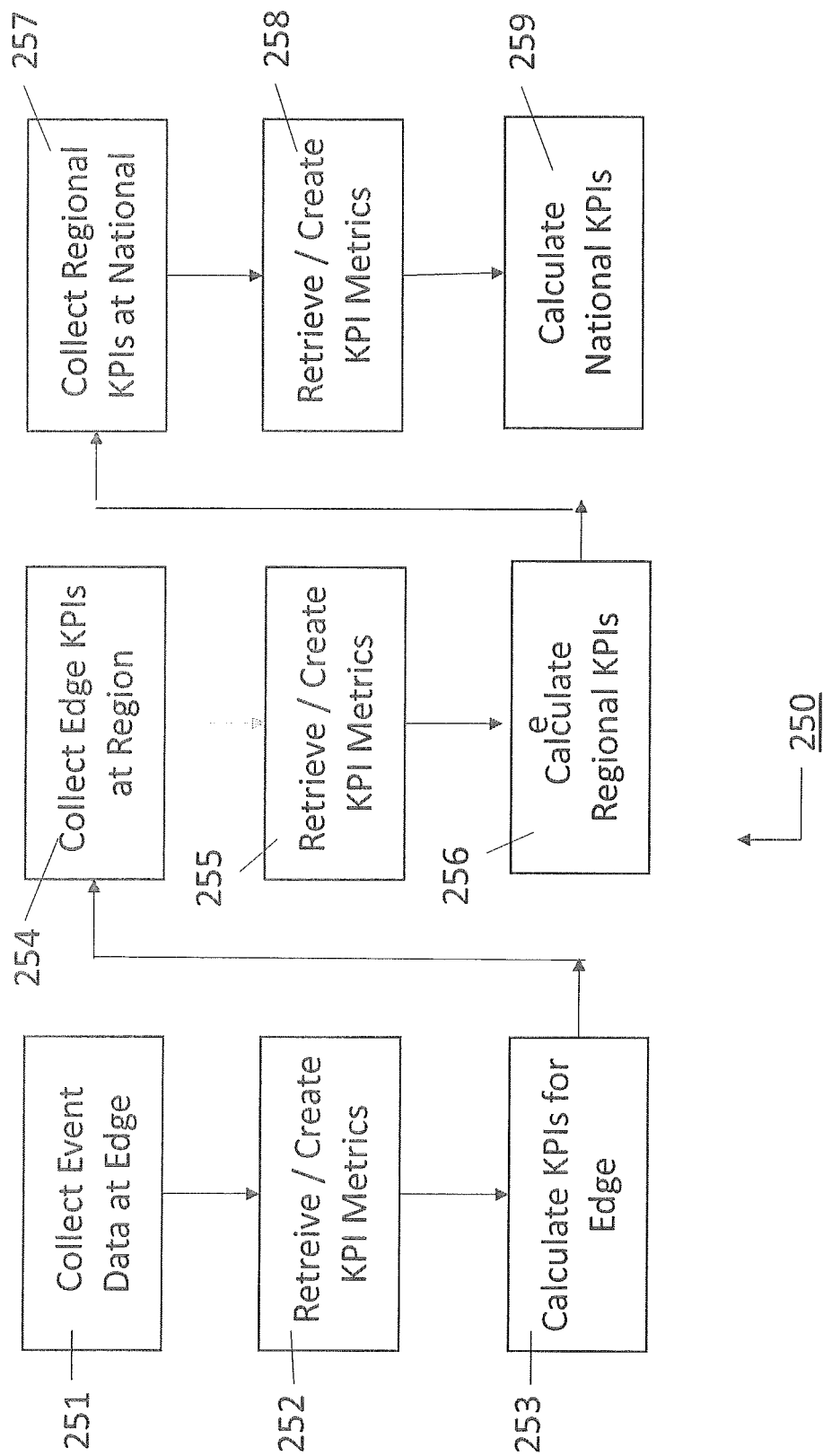
FIG. 8 illustrates an exemplary method for calculating network KPIs using a hierarchal KPI architecture.

With reference to FIG. 8, there is shown an exemplary method 250 in which a hierarchal KPI engine architecture may be implements. At 251, event data at an edge may be collected. At 252, KPI metrics to be used may be retrieved from the KPI metrics catalog and used as is or modified for use by the KPI engine. At 253, the KPIs are calculated by the KPI engines at the edge of the network. A similar process may be followed for each region. At 254, edge KPIs are collected at the region level. AT 255, regional KPI metrics to be used may be retrieved from the KPI metrics catalog and used as is or modified for use by the KPI engine. At 256, the KPIs are calculated by the KPI engines regionally within the network. A similar process may be followed for the national network. At 257, regional KPIs are collected at the national level. AT 258, national KPI metrics to be used may be retrieved from the KPI metrics catalog and used as is or modified for use by the KPI engine. At 259, the KPIs are calculated by the KPI engines nationally for the network.

In view of the foregoing, this disclosure provides a practical application that builds a centralized system to standardize the management of a KPI metrics catalog and events metadata. There is a generic KPI calculation engine which can be used to calculate any KPIs based on the network and event configuration instead of ad hoc development for each KPI, thereby eliminating lengthy development and testing time for new/modified KPIs. The disclosure provides a new and novel KPI calculation architecture wherein KPI metrics may be calculated and aggregated at the edge nodes. This reduces the amount of transport required for event data and optimally shared among edge and central network nodes. The disclosure uses a new JSON-based configuration format which can be used by the generic KPI calculation engine.

The disclosure provides a system that may standardize the management of all events metadata and KPI metrics catalog in AT&T. The systems and methods make it possible to rapidly enable new KPIs without going through a long development cycle. The system and methods will help drastically reduce data volume and associated computing and networking needs to the ECOMP platform and downstream systems by providing the metrics they need to proceed, rather than raw data that would need to be processed.

While the disclosure has been described in relation to a generic network, it will be understood that the systems and methods disclosed herein may be deployed in both edge and central clouds to support current and future 5G real time use cases. Moreover, the architecture may also be used by carrier or third-party vendors to calculate worldwide KPIs.

Network Description.

Figure 9:
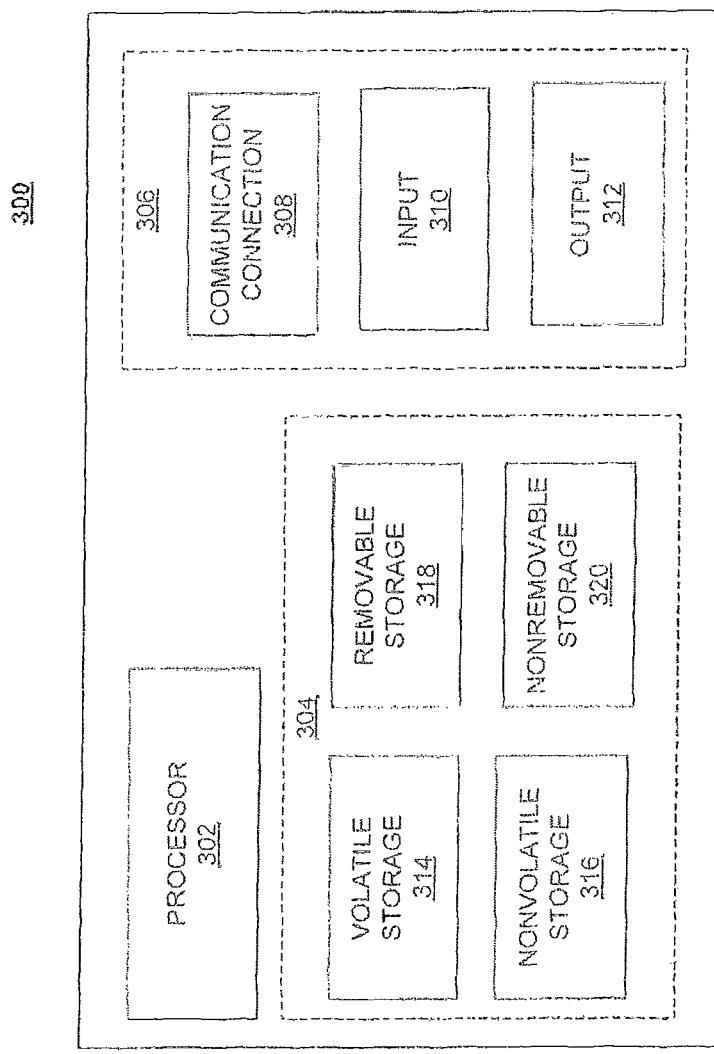
FIG. 9 illustrates a schematic of an exemplary network device.

FIG. 9 is a block diagram of network device 300 that may be connected to the network described in FIG. 1 or which may be a component of such a network. Network device 300 may comprise hardware or a combination of hardware and software. The functionality to facilitate telecommunications via a telecommunications network may reside in one or combination of network devices 300. Network device 300 depicted in FIG. 9 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 9 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 9) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communication (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 10:
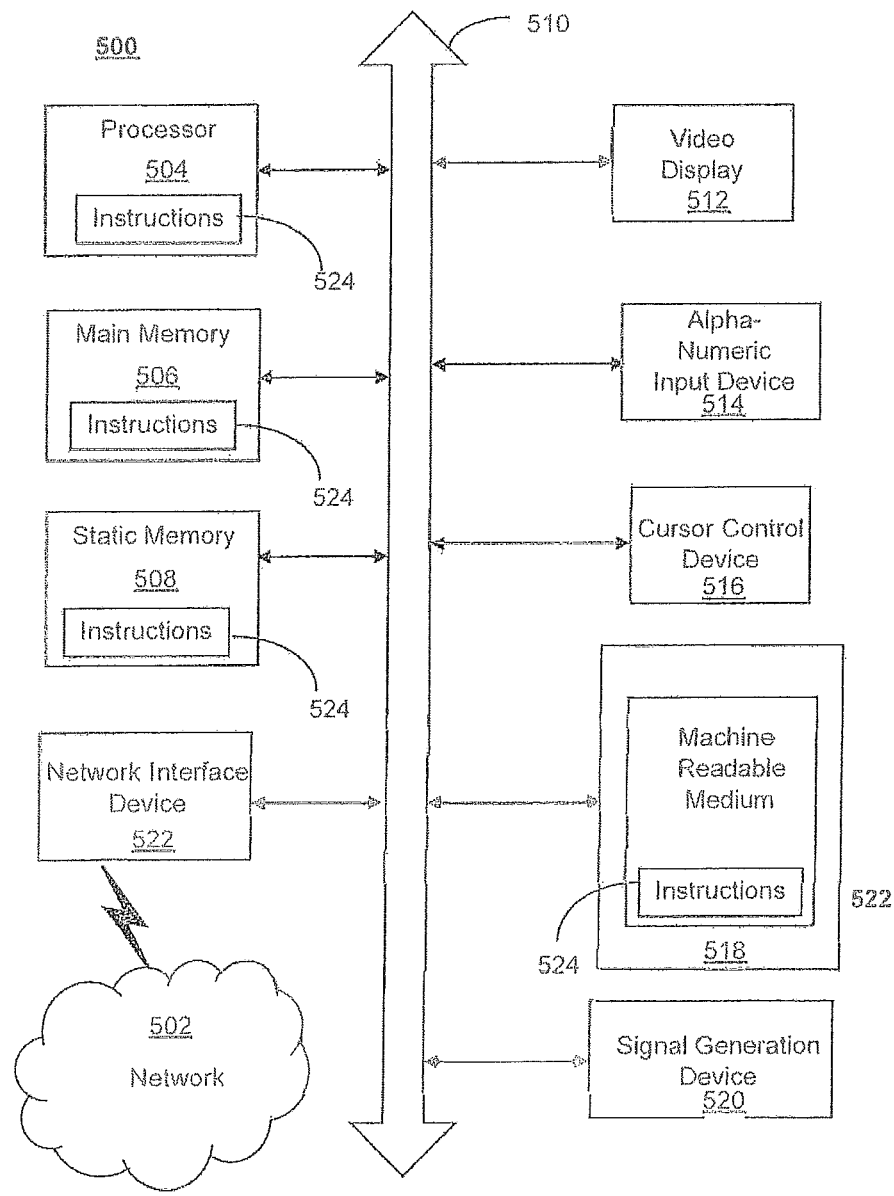
FIG. 10 illustrates an exemplary communication system that provides wireless telecommunication services over wireless communication networks.

FIG. 10 depicts an exemplary diagrammatic representation of a machine in the form of a computer system 500 within which a set of instructions, when executed, may cause the machine to perform any one or more of the methods described above. One or more instances of the machine can operate, for example, as processor 302, server 112, mobile device 101, in 102, MME 103, and other devices of FIG. 1 and FIG. 2. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, internet of things (IOT) device (e.g., thermostat, sensor, or other machine-to-machine device), or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 11:
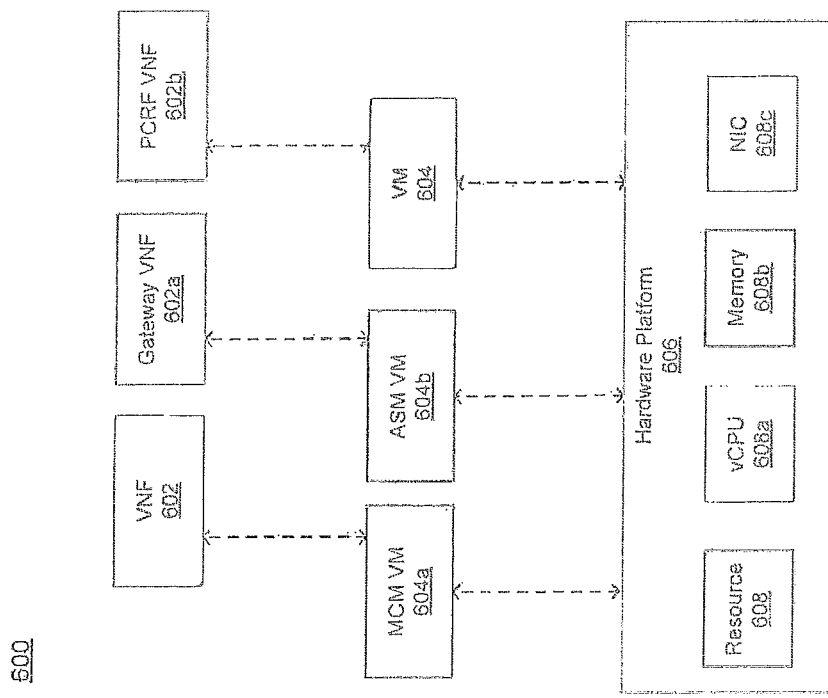
FIG. 11 is a representation of an exemplary network.

FIG. 11 is a representation of an exemplary network 600. Network 600 (e.g., network 111) may comprise an SDN— that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 11 illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 11 illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 12:
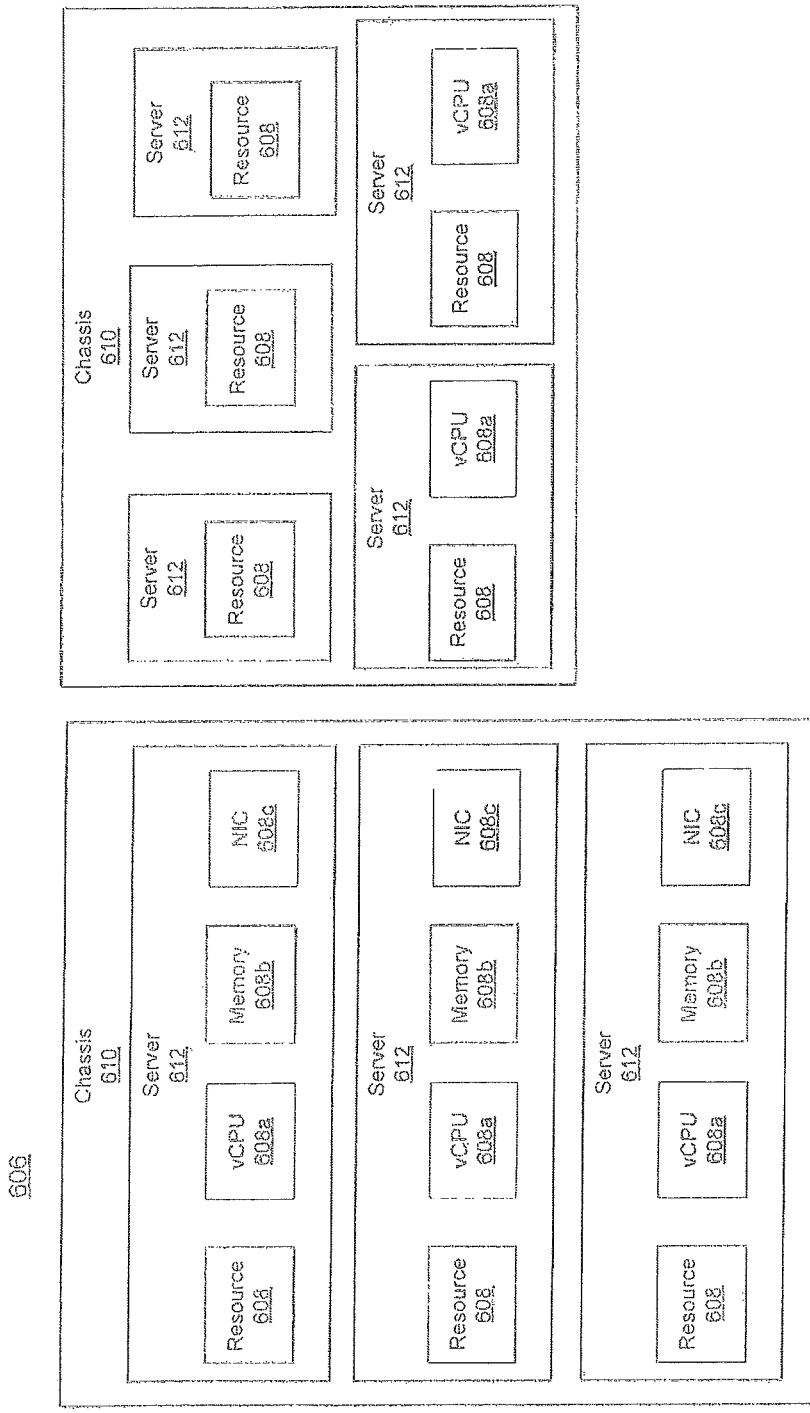
FIG. 12 is a representation of an exemplary hardware platform for a network.

While FIG. 11 illustrates resources 608 as collectively contained in hardware platform 606, the configuration of hardware platform 606 may isolate, for example, certain memory 608c from other memory 608c. FIG. 12 provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally, or alternatively, chasses 610 may be communicatively coupled together (not shown) in any combination or arrangement.

The characteristics of each chassis 610 and each server 612 may differ. For example, FIG. 12 illustrates that the number of servers 612 within two chasses 610 may vary. Additionally, or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally, or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604*a* be instantiated on the same server 612 (or chassis 610). As another example, if VNF 602 uses MCM VMs 604*a*, ASM VMs 604*b*, and a third type of VMs 604, an affinity rule may dictate that at least the MCM VMs 604*a* and the ASM VMs 604*b* be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604*a* be instantiated on a particular server 612 that does not contain any ASM VMs 604*b*. As another example, an anti-affinity rule may require that MCM VMs 604*a* for a first VNF 602 be instantiated on a different server 612 (or chassis 610) than MCM VMs 604*a* for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602*a* and PCRF VNF 602*b*. Gateway VNF 602*a* may require five VMs 604 instantiated on the same server 612, and PCRF VNF 602*b* may require two VMs 604 instantiated on the same server 612. (Assume, for this example, that no affinity or anti-affinity rules restrict whether VMs 604 for PCRF VNF 602*b* may or must be instantiated on the same or different server 612 than VMs 604 for gateway VNF 602*a*.) In this example, each of two servers 612 may have sufficient resources 608 to support 10 VMs 604. To implement sessions using these two servers 612, first server 612 may be instantiated with 10 VMs 604 to support two instantiations of gateway VNF 602*a*, and second server 612 may be instantiated with 9 VMs: five VMs 604 to support one instantiation of gateway VNF 602*a* and four VMs 604 to support two instantiations of PCRF VNF 602*b*. This may leave the remaining resources 608 that could have supported the tenth VM 604 on second server 612 unused (and unusable for an instantiation of either a gateway VNF 602*a* or a PCRF VNF 602*b*). Alternatively, first server 612 may be instantiated with 10 VMs 604 for two instantiations of gateway VNF 602*a* and second server 612 may be instantiated with 10 VMs 604 for five instantiations of PCRF VNF 602*b*, using all available resources 608 to maximize the number of VMs 604 instantiated.

Consider, further, how many sessions each gateway VNF 602*a* and each PCRF VNF 602*b* may support. This may factor into which assignment of resources 608 is more efficient. For example, consider if each gateway VNF 602*a* supports two million sessions, and if each PCRF VNF 602*b* supports three million sessions. For the first configuration—three total gateway VNFs 602*a* (which satisfy the gateway requirement for six million sessions) and two total PCRF VNFs 602*b* (which satisfy the PCRF requirement for six million sessions)—would support a total of six million sessions. For the second configuration—two total gateway VNFs 602*a* (which satisfy the gateway requirement for four million sessions) and five total PCRF VNFs 602*b* (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which generic KPIs can be created, cataloged and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a processing system including a processor; and
a memory that stores executable instructions that, when executed by the system, facilitate performance of operations, the operations comprising:
collecting first data utilizing a first network edge collector;
operating on the first data by a first network edge key performance indicator (KPI) engine;
initiating communication between the first network edge KPI engine and a KPI metrics manager, wherein the KPI metrics manager controls a KPI metric catalog;
providing a location of the first network edge KPI engine to the KPI metrics manager;
obtaining a metric algorithm from the KPI metric catalog from the KPI metrics manager, wherein the KPI metrics manager selects the metric algorithm based on the location of the first network edge KPI engine;
determining a first edge KPI metric using the metric algorithm from the KPI metric catalog on the first data; and
providing the first edge KPI metric to the KPI metrics manager.

2. The system of claim 1, wherein the operations comprise:
collecting second data utilizing a second network edge data collector;
operating on the second data by a second network edge KPI engine;
initiating communication between the second network edge KPI engine and the KPI metrics manager; and
determining a second edge KPI metric using the metric algorithm from the KPI metric catalog.

3. The system of claim 2, wherein the operations comprise executing a KPI metric algorithm from the KPI metric catalog using the first edge KPI metric and the second edge KPI metric by a regional KPI engine.

4. The system of claim 1 wherein the KPI metrics manager provides a representational state transfer application programming interface (REST API) to the first edge KPI metrics engine to access the KPI metric catalog.

5. The system of claim 1 wherein the operations comprise modifying a KPI metric algorithm from the KPI metric catalog based on receipt of a representational state transfer application programming interface (REST API) from the KPI metrics manager utilizing a user interface resulting in a modified KPI metric; and
storing the modified KPI metric algorithm in the KPI metric catalog.

6. The system of claim 1 wherein the first data is streamed to the first network edge KPI engine.

7. The system of claim 1 wherein the first data is input in a batch mode to the first network edge KPI engine.

8. The system of claim 1 wherein the first network edge KPI engine accesses the first data using a Hadoop distributed file system.

9. The system of claim 1 wherein the first network edge KPI engine includes a machine learning algorithm.

10. A method comprising:
receiving, by a processing system including processor, a first request for a first key performance indicator (KPI) metric and location information from a network edge processing device, wherein a KPI metrics manager comprises the processing system, wherein the location information is associated with the network edge processing device;

submitting, by the processing system, a query to a KPI metric catalog;

selecting, by the processing system, a first KPI metric algorithm according to the location information; and forwarding, by the processing system, the first KPI metric algorithm to a first KPI engine for a calculation of a first KPI metric, wherein the network edge processing device comprises the first KPI engine; and receiving, by the processing system, the first KPI metric from the first KPI engine.

11. The method of claim 10 wherein the first request is based on a first data set collected by a network.

12. The method of claim 10 wherein the KPI is customized based on event metadata associated with a network.

13. The method of claim 12 wherein the query is dynamically generated based on the event metadata.

14. The method of claim 13 further comprising refreshing, by the processing system, a state of a KPI manager based on the event metadata.

15. The method of claim 10 further comprising:
receiving, by the processing system, a request for a second key KPI metric;

submitting, by the processing system, a second query to the KPI metric catalog;

selecting, by the processing system, a second KPI metric algorithm; and forwarding, by the processing system, the second KPI metric algorithm to a second KPI engine for a calculation of a second KPI metric.

16. The method of claim 15 wherein the first KPI engine operates on a first edge network data set and the second KPI engine operates on a second edge network data set.

17. The method of claim 16 further comprising:
receiving, by the processing system, a request for a third KPI metric;

submitting, by the processing system, a third query to the KPI metric catalog;

selecting a third KPI metric algorithm; and forwarding the third KPI metric algorithm to a third KPI engine for a calculation of a third KPI metric, wherein the third KPI engine operates on the first KPI metric and the second KPI metric.

18. A method comprising:
obtaining, by a processing system including a processor, event metadata and location information associated with a group of network edge processing devices;

calculating, by a processing system, key performance indicators (KPIs) on event metadata according to the location information, wherein the processing system comprises a KPI metrics manager;

aggregating, by the processing system, the KPIs from the calculating step; and determining, by the processing system, regional KPIs based on the aggregating step; and providing, by the processing system, the regional KPIs to a group of regional KPI engines.

19. The method of claim 18 further comprising accessing, by the processing system, a KPI metric algorithm from a KPI metrics catalog, wherein the calculation step is performed using the KPI metric algorithm.

20. The method of claim 19 further comprising accessing, by the processing system, a second KPI metric algorithm from the KPI metrics catalog, wherein the determining step is performed using the second KPI metric algorithm.

* * * * *

UNITED STATES PATENT AND TRADEMARK OFFICE
CERTIFICATE OF CORRECTION

PATENT NO. : 11,381,463 B2
APPLICATION NO. : 16/721248
DATED : July 5, 2022
INVENTOR(S) : Huijing Yang et al.

Page 1 of 1

It is certified that error appears in the above-identified patent and that said Letters Patent is hereby corrected as shown below:

In the Claims

Claim 18: Column 18, Line 20, delete "and"

Signed and Sealed this
Thirtieth Day of August, 2022

Katherine Kelly Vidal
*Director of the United States Patent and Trademark Office*